Oct. 31, 1944.    R. W. GUDIE    2,361,686
RADIO-OPERATED AUTOMATIC PILOT
Filed June 23, 1941    4 Sheets-Sheet 1
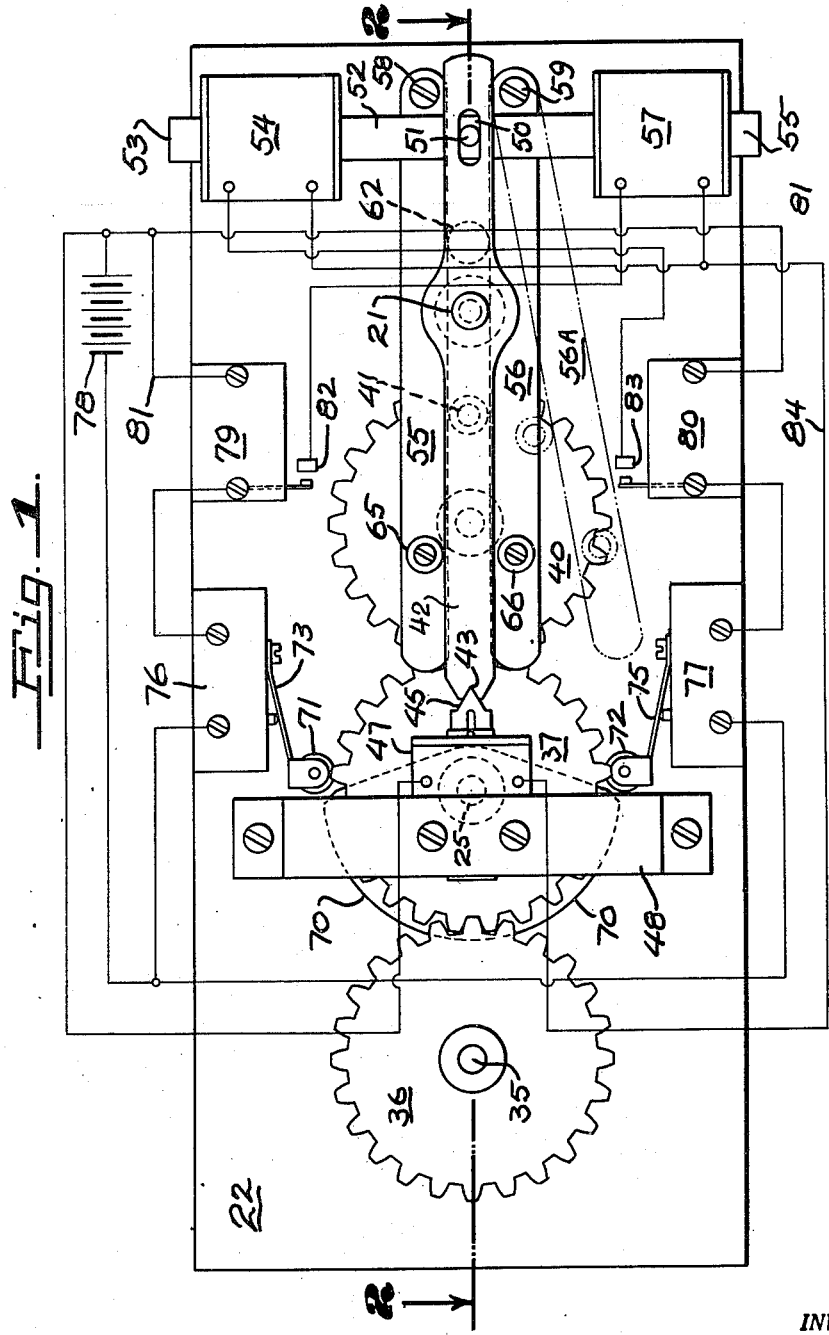
INVENTOR,
RAY W. GUDIE.
BY
ATTORNEYS.

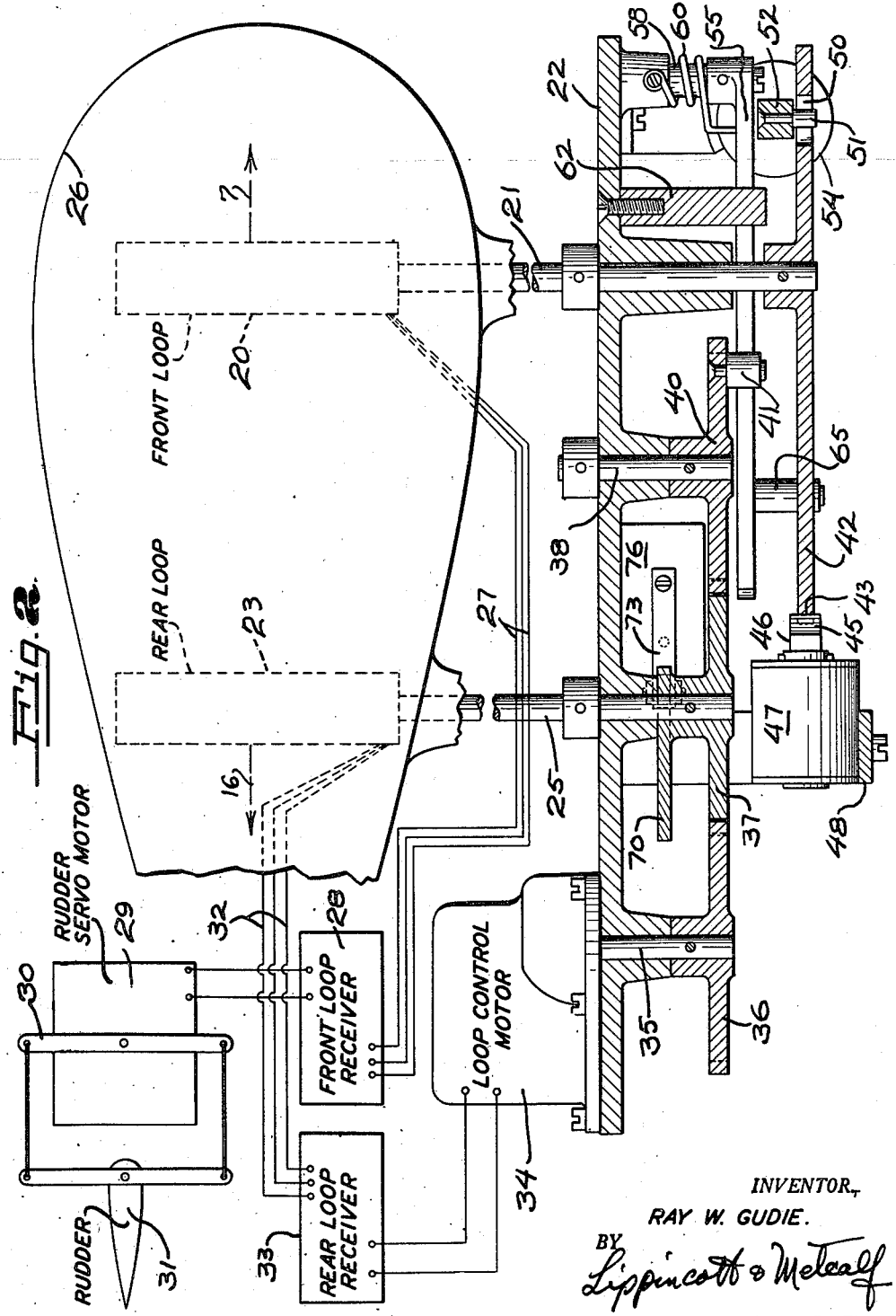

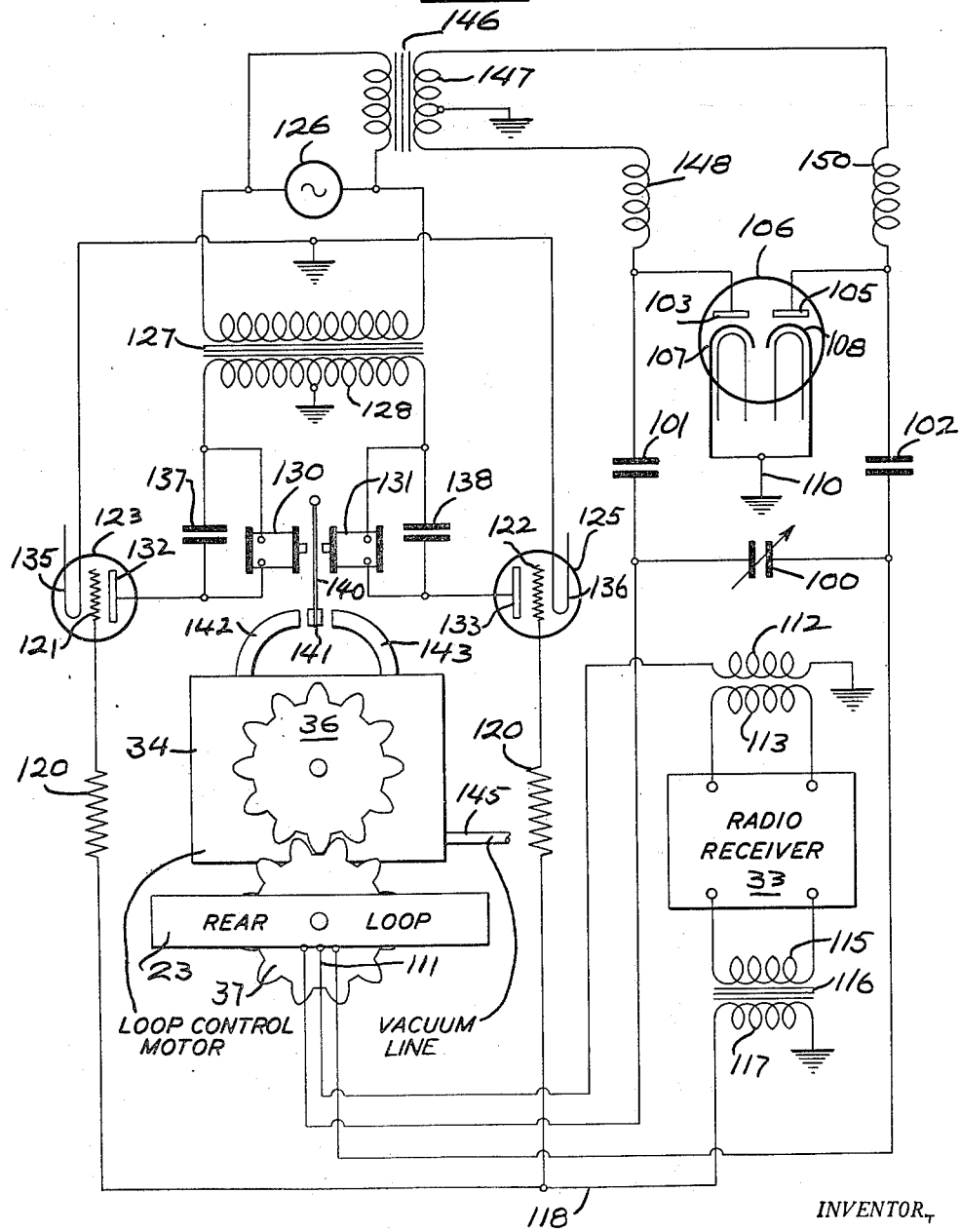

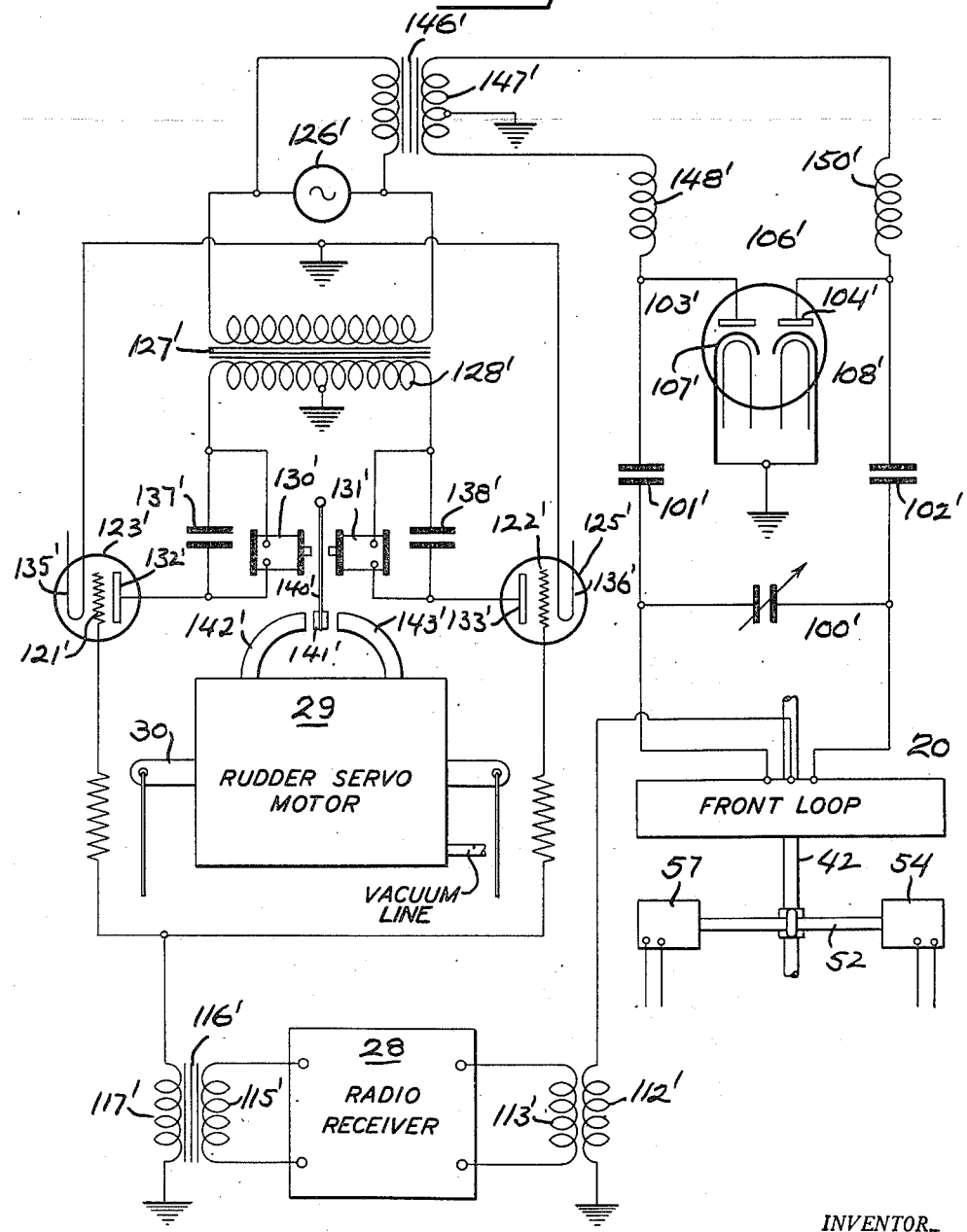

Patented Oct. 31, 1944

2,361,686

UNITED STATES PATENT OFFICE 2,361,686

RADIO-OPERATED AUTOMATIC PILOT

Ray W. Gudie, Los Angeles, Calif.

Application June 23, 1941, Serial No. 399,369

19 Claims. (Cl. 250—2)

My invention relates to radio-operated automatic pilots for dirigible vehicles, and more particularly to an automatic pilot which will control the vehicle to give a substantially straight line of progression.

Among the objects of my invention are: To keep a vehicle on a course with relation to two radio transmitters within the limits of accuracy of a pair of radio-direction finders; to provide such an automatic pilot which automatically locates the course provided the vehicle is within a reasonable position along the course; to provide such an automatic pilot which will cause the vehicle to approach the course at a diminishing angle, the angle depending upon the amount the vehicle is off course; to provide an automatic pilot which will automatically assume the correct crab angle to compensate for wind or other drift factors; to provide an automatic pilot which will not hunt or over-control; to provide an automatic pilot using two radio-direction finding units, one of which can maintain control of the vehicle, while the other is temporarily utilized for communication purposes; to provide an automatic pilot using two radio-direction finding units, one unit of which will control the path of the vehicle while the other unit is being temporarily used for cross bearing determinations.

Broadly, my invention comprises a straight line of flight radio automatic pilot incorporating two automatic radio-direction finders receiving energy from spaced radio transmitters. These are so interconnected that they will operate the controlling servo-motor of an airplane, ship, or land vehicle for navigation along a straight line, within the accuracy of the direction finding systems, over land, water, or on the ground.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself in any way, to the apparatus of the present application, as I may adopt various other apparatus embodiments utilizing the method, within the scope of the appended claims.

In the drawings:

Fig. 1 is a bottom plan view of the linkage between a pair of radio-direction finding loop antennae, together with a wiring diagram of certain parts thereof.

Fig. 2 is a view partly in section, partly in elevation, and partly diagrammatic, showing the device of Fig. 1 as taken along the line 2—2 in Fig. 1, together with the loop antenna connections and radio control circuit.

Figs. 3 and 4 are circuit diagrams of the radio control circuits attached to the rear and front loops, respectively.

Broadly, I utilize an automatic homing pilot as in the system receiving signals from one reference transmitting station, and connect this homing system to operate the rudder of the airplane. I utilize a second direction finding unit to receive signals from a second reference transmitting station to direct the airplane toward course, and to select the proper crab angle. Whenever the airplane is on the proper course and cross winds are absent, the homing station unit has complete control of the airplane and acts as a fixed loop unit. Whenever the airplane is forced off course, the second direction finding system, operated by signals from the second transmitting station, turns the loop of the homing system with respect to the longitudinal axis of the airplane within limits in proportion to the amount the airplane is off course. When the airplane is on course, the nose thereof is continually crossing across the front station line, flying the normal sine wave curve, and the rear loop is keeping its null axis alined with the rear station. During this normal on course swinging time, however, the movement of the rear loop is so correlated with the front loop that it does not affect the front loop. Not until the rear loop has been moved to and held at an angle to the longitudinal axis of the airplane, indicating that the airplane is off course, for say 10 seconds or some other predetermined time, does the rear loop movement act on the front loop. This enables the front loop to keep the nose of the airplane on the front station when on course, within a minimum of swing, and provides exactly the same control when on course as though the rear unit were disconnected.

If, however, an angular displacement of the null axis of the rear loop with respect to the longitudinal axis of the airplane persists longer than the predetermined time set up, thus indicating that the airplane is clearly off course and not merely cyclically swinging over the proper course line, then the rear loop is automatically interlinked with the front loop to turn the front loop in direction and amount necessary to bring the airplane, through the front loop receiver and rudder control, back to the course line, and at a crab angle if needed.

There are numerous electrical and mechanical systems which will accomplish the above results.

Electrical positioners may be used to rotate the front loop in relationship to the rear loop, or vacuum motors may be utilized.

It is also possible to hold the front loop in a fixed position and utilize the rotation of the rear loop to apply bias to the trigger tubes controlling the rudder control motor, and to make this bias relative to the amount which the rear loop is rotated from its normal position.

A detailed description of a mechanical controlling assembly for accomplishing the selective interlinkage of front and rear loops, as shown in Figs. 1 to 4, inclusive, will more fully bring out the advantages of my invention.

Referring first to Figs. 1 and 2, a front loop 20 receiving radio signals from one station as indicated by arrow 7 is mounted on a rotatable front loop shaft 21 journaled in a base plate 22. Immediately behind front loop 1 is a rear loop 23 receiving signals from the second station as indicated by arrow 16. Rear loop 23 is mounted on and rotates with a rear loop shaft 25, also mounted on base plate 22. Both loops are preferably contained in a streamlined housing 26. Front loop 20 is connected by front loop receiver input line 27 to a front loop receiver 28, the output of which controls a rudder servo-motor 29 having an operating bar 30 connected to operate the rudder 31 of the airplane. The wiring diagram for this system is shown in Fig. 4 and will be described later. The rear loop 23 is connected through a rear loop input circuit 32 to a rear loop receiver 33 which in turn controls the rotation of a loop control motor 34 mounted on base plate 22 to rotate a loop control shaft 35 extending through the base plate 22. On the lower end of loop control shaft 35 is a motor gear 36 which meshes with a rear loop gear 37 on the lower end of rear loop shaft 25. Between rear loop shaft 25 and front loop shaft 21 is positioned a linkage gear shaft 38 having mounted on the lower end thereof a linkage gear 40 meshing rear loop gear 37. Consequently, rotation of the loop control motor 34 will rotate the rear loop and linkage gear 40. All shafts are preferably alined and parallel.

Linkage gear 40 carries near the periphery thereof an operating roller 41 extending downwardly below the end of linkage gear shaft 38. Front loop shaft 21 is provided at its lower end with a loop control arm 42 extending longitudinally below plate 22, and gears 36, 37, and 40. The end of the loop control arm 42 under the gears is provided with a notch 43 in which a latch 45 is normally positioned, this latch being on the end of lock solenoid core 46, this core being lightly spring pressed outwardly and under control of a lock solenoid coil 47 mounted on bracket 48 depending from base plate 22. The opposite end of loop control arm 42 is provided with an elongated aperture 50 in which is positioned a front loop drive pin 51 connected to a crossbar 52, the end portions of this crossbar being formed as right and left cores 53 and 55, these cores being under control of front loop drive solenoids 54 and 57, respectively. Bar 52 is capable of free lateral movement upon energization of either coil 54 or 57.

On each side of front loop shaft 21 and extending above and substantially parallel to front loop arm 42, are parallel linkage arms 55 and 56, these linkage arms being pivoted at one end only, on pins 58 and 59 extending downwardly from base plate 22. These arms 55 and 56 are spring pressed toward each other by springs 60 to normally lie in parallel position and parallel to arm 42. The arms are maintained parallel to the normal position of arm 42 by spacing pin 62 dependent from base plate 22. Arms 55 and 56 are so positioned that linkage roller 41 will bear against one or the other of these linkage arms in accordance with the direction of rotation of linkage gear 40. One or the other of the arms 55 and 56 may be moved outwardly by rotation of linkage gear 40 as indicated by the broken line 56A in Fig. 1.

Extending downwardly from each arm 55 and 56, into the paths of rotation of arm 42 are control rollers 65 and 66, respectively, so that when a linkage arm 55 or 56 is moved outwardly, one of the rollers 65 or 66 will act as a stop beyond which arm 42 cannot rotate, as will be explained later.

Mounted on rear loop shaft 25 just above gear 37 is a substantially semi-circular cam 70, symmetrically positioned with respect to normal extent of front loop arm 42. On each side of cam 70 are positioned cam rollers 71 and 72, these rollers being mounted on operating arms 73 and 75, respectively, of sensitive switches 76 and 77.

In Fig. 1, I have shown the electrical connections of these sensitive switches to front loop drive solenoids 54 and 57. A source of current 78 is provided, one side of which leads directly through both sensitive switches. The other sides of the sensitive switches are connected to timing switches 79 and 80, respectively, these switches being of any well known type which will, after a predetermined length of time, close a circuit therethrough. The timing switches are actuated through line 81 returning directly to source 78.

Timing switches 79 and 80 operate left and right contacts 82 and 83, respectively, these contacts being connected on one side thereof to the respective sensitive switches 76 and 77, and on the other side to the respective front loop drive solenoids 57 and 54. The current, after passing through one or the other of solenoids 54 or 57 returns through line 84, and through lock solenoid 47 to the other side of the battery. Thus upon closure of either sensitive switch, the corresponding front loop solenoid will be energized, only however, after a predetermined time has elapsed. Irrespective of which front loop solenoid is energized, the lock solenoid 47 will be energized to withdraw latch 45 from notch 43, thus freeing arm 42.

The basic radio and direction finding circuits hereinafter described are common to the direction finding art, and their insertion herein is for the express purpose of clarifying the action of the associated equipment herewith described. Referring now to Fig. 3 for description of the rear loop circuit:

The loop control impulse is derived from a directional radio-receiving system comprising the rear loop 23 as already described. The loop 23 is tuned by a variable condenser 100 to a radio wave transmitted from the second transmitting station 16, and the two terminals of the loop are connected through blocking condensers 101 and 102 to the two anodes 103 and 105 of a double diode rectifier tube 106, the two cathodes 107 and 108 being connected together and to ground 110. A center tap 111 on the loop also connects to ground through the primary 112 of a radio-frequency transformer whose secondary 113 feeds rear loop radio receiver or detector amplifier combination 33 of conventional design. This receiver may be of the superheterodyne or tuned radio-frequency type or any other sufficiently sensitive radio receiver. The output of the final detector of this receiver supplies the primary 115 of an audio-frequency output transformer 116. One end of the secondary 117 of the output transformer is connected to ground. The other end connects through a lead 118 to the neutral point of a split resistance 120—120, the ends of which energize the grids 121 and 122 of a pair of output tubes 123 and 125. These two tubes may be either high vacuum amplifier tubes as shown, or they may be gaseous conduction tubes of the "grid-glow" or "thyratron" type. In either event, their plate supply is alternating current supplied by an alternator 126 through a supply transformer 127 whose secondary 128 is center-tapped and grounded and whose terminals connect through the opposed relay coils 130 and 131, to the output tube plates 132 and 133. The filaments 135 and 136 are energized and connected in the usual manner. By-pass condensers 137 and 138 are preferably bridged across the relay coils to assist in the elimination of any components in the receiver output which are derived from the reception of modulated waves.

The coils 130 and 131 act in opposition against a common armature 140, which carries upon its end a valve member 141, so that the operation of the relay in either direction serves to close one or the other of a pair of air tubes 142 and 143 and thus actuate the loop control motor 34 which turns the rear loop 23 in one direction or the other, depending on which of the air tubes 142 or 143 is blocked by the valve 141.

Vacuum line 145 supplies energy for the loop control motor, which may be any type of conventional air motor continuously rotatable in either direction as determined by action of valve member 141.

The anodes 103 and 105 of the double diode tube 106 are excited by alternating potential and current supplied by the A. C. source 126 through a transformer 146, the secondary 147 of which is center-tapped and grounded, and whose terminals connect to the anodes 103 and 105 through radio-frequency choke coils 148 and 150.

The currents passing through transformer 116 will vary in direction in accordance with the angular displacement of the loop on each side of the null axis thereof and this variation in direction is utilized to operate the loop control motors.

Trigger tubes 123 and 125 are adjusted to normally be held just below their triggering points by variation of bias voltage on the grids thereof when there is no alternating component in transformer 116. Consequently, if audio signals of strength sufficient to cause triggering are imposed on the bias voltage through line 118, one or the other of the tubes will become triggered in accordance with the direction of the current through transformer 116, the tube having a positive voltage superimposed on its bias voltage triggering at the half cycle as the voltage is impressed on it by alternator 126 through transformer 127. A pulsating current will then follow through the relay coil 130 or 131 in series with the anode of the triggered tube, causing the closing of one of the relays and rotation of the rear loop by the loop control motor, until the null position is reached by the loop, whereupon no current will flow through output transformer 116, and no further loop rotation will occur.

Thus it can be seen that the rear loop will be automatically turned to seek the null position with respect to signals coming from the second transmitting station.

In Fig. 4 I have shown the circuit of the front loop for control thereby of the rudder servo-motor to follow the homing course of the airplane. Inasmuch as this circuit is a control circuit for the rudder servo-motor and is a substantial duplicate of the control circuit for the rear loop control motor, I will not again describe the circuit, but will designate the same parts of the circuit with prime numbers, corresponding to the numbers of the circuit of Fig. 3.

Thus it can be seen that the front loop, if in proper fixed position on the airplane, will fly the airplane on a homing course toward one of the stations.

I will now describe the action of the linkage between the front and rear loops, as shown in Figs. 1 and 2 in order that it may be understood how the homing action of the front loop is modified by the action of the rear loop when necessary, and only then.

As the rear loop 23 is rotated by the connected system, operating roller 41 will bear against one or the other of arms 55 or 56 in accordance with the direction of rotation of gear 40. Loop control motor 34 is made to have sufficient power to overcome the spring bias of arms 55 or 56. At the same time, however, that rear loop shaft 25 is rotated, one or the other of the sensitive switches 76 or 77 is closed by the operation of cam 70 bearing against rollers 71 or 72. Irrespective of which switch 76 or 77 is closed, one or the other of the timing switches 79 or 80 is energized. This timing switch starts but no energization of either loop drive solenoid 54 or 57 takes place until after the rear loop remains turned away from its normal position for a predetermined length of time, say for example, 10 seconds. This time delay is a function of the flight characteristics of each type of airplane, etc. If, at the end of 10 seconds, for example, the loop is still turned away from its normal position, then the timing switch makes contact and energizes solenoid 54 or 57, depending on whether switch 77 or 76 is closed, and releases arm 42, by withdrawing latch 45 from notch 43. The solenoid current, acting on one of the cores 53 or 55, turns the unlocked loop arm and its connected front loop with respect to the longitudinal axis of the airplane. The rotation of the front loop, however, can only be made in an amount as allowed by stops 65 and 66, and in a direction as determined by the switch which is energized by the rotations of the rear loop. The front loop can only be moved as far as the linkage arm 55 or 56 has already been moved by the rear loop, as the solenoids 54 and 57 are so designed that they do not have sufficient power to overcome the tension of bias springs 60. In other words, as soon as arm 42 moves to a point where the arm contacts one of rollers 65 or 66, the front loop no longer rotates. Consequently, the amount that the front loop 20 is turned is directly related to the rotation of the rear loop. Consequently the correcting force directing the airplane back toward the course due to the turning of the front loop acting on the rudder, is relative to the amount the plane is off course. Thus it can be seen that the rotation of the front loop by a setting of the rear loop by an amount that is predetermined by the rear loop, automatically takes the place of a manual drift correction and a correction is made which is proportional to the down wind displacement even though the amount of such displacement is unknown and even though the cross wind which causes it is unknown, or changes in intensity.

The timing switches 79 and 80 prevent correctional movements being applied to the front loop during the normal swinging of the plane on a straight course, and it is only when the rear loop has been displaced for a predetermined length of time that the front loop will be rotated. As the rear loop moves to normal position linkage arms 55 and 56 move arm 42 to normal position, and latch 45 again enters notch 43.

Thus it can be seen that for all normal flying, the front loop is a fixed loop, being held as a fixed loop by latch 45 entering into notch 43 of arm 42. If, however, a displacement from course occurs which lasts for a time determined by the time switch 79 or 80, for example, 10 seconds, then the front loop is released and thereafter acts as a movable loop to apply the proper correctional impulses to the craft through the rudder.

It is obvious also that inasmuch as under normal circumstances the airplane can be placed under the full control of the front loop only, the rear loop and its associated receiver can be utilized for other purposes. By disconnection of the sensitive switches, the front loop will remain locked in, or will return to normal position, and the rear loop with its associated remote indicator and receiver may then be temporarily utilized to take cross bearings on transmitting stations, for example, or for communication reception. While the rear loop is being so utilized, the front loop continues control of the airplane as a fixed loop. As soon as the rear loop and its associated apparatus is switched back into linkage relationship to the front loop, it will operate on the front loop if the airplane has, in the meantime, gone off course. The off course displacement will then be immediately corrected.

While the device I have above described is ideally adapted for flying a course included between a front and a rear station, the same device can be used to fly toward two stations, or if desired, to fly away from two stations.

Whenever this automatic pilot is used to fly away from two stations, it is only necessary to reverse the phase of the front loop in order to change the null position 180°. This causes the servo-motor to keep the tail of the ship pointed toward one station instead of the nose, and the rear rotatable loop keeps the plane on a true line away from the second station.

When flying toward two stations, the phase of the rear loop is reversed and the rear loop is tuned to the furthest station.

By changing the phase relationships of the loops and changing the front and rear loops with relation to the closest and furthest stations, it is possible to obtain several different sets of conditions which will cause the ship to either fly along a bisector of the angle between the two stations, or rather, to an imaginary line drawn through the two reference stations, and then proceed along this line towards the stations.

It will also be obvious that an azimuth indicator may be operated from each of the loops, these indicators being positioned on the pilot's control board, not only for check of the operation of the automatic system, but also so that the system can be operated as an indicating system only, with control of the vehicle by the pilot in accordance with the respective indications, if desired.

I claim:
1. Radio control apparatus for a dirigible vehicle comprising a pair of directional antennas mounted on and rotatable with respect to said vehicle, a receiver connected to each of said antennas, means for rotating one of said antennas in accordance with the sign of the output of its receiver to cause said latter antenna to assume a position in accordance with the direction of a first reference radio transmitter with respect to the longitudinal axis of said vehicle, means connecting the output of the other receiver to control the rudder of said vehicle to steer said vehicle toward a second reference radio transmitter, and means for rotating the directional antenna connected to the last mentioned receiver, in accordance with the position of the first mentioned antenna.

2. Radio control apparatus for a dirigible vehicle comprising a pair of directional antennas mounted on and rotatable with respect to said vehicle, a receiver connected to each of said antennas, means for rotating one of said antennas in accordance with the sign of the output of its receiver to cause said latter antenna to assume a position in accordance with the direction of a first reference radio transmitter with respect to the longitudinal axis of said vehicle, means connecting the output of the other receiver to control the rudder of said vehicle to steer said vehicle toward a second reference radio transmitter, and means for rotating the antenna connected to the last mentioned receiver, by an amount corresponding to the angular displacement of the first mentioned antenna with respect to the longitudinal axis of said vehicle.

3. Radio control apparatus for a dirigible vehicle comprising a pair of directional antennas mounted on and rotatable with respect to said vehicle, a receiver connected to each of said antennas, means for rotating one of said antennas in accordance with the sign of the output of its receiver to cause said latter antenna to assume a position in accordance with the direction cf a first reference radio transmitter with respect to the longitudinal axis of asid vehicle, means connecting the output of the other receiver to control the rudder of said vehicle to steer said vehicle toward a second reference radio transmitter, means for rotating the antenna connected to the last mentioned receiver in accordance with the position of the first mentioned antenna, and means for delaying said last mentioned rotation for a predetermined length of time.

4. Radio control apparatus for a dirigible vehicle comprising a first directional antenna mounted on and rotatable with respect to said vehicle, a receiver connected to said antenna, means for rotating said antenna in accordance with the sign of the output of its receiver to cause said antenna to assume a position in accordance with the direction of a first reference radio transmitter with respect to the longitudinal axis of said vehicle, a second directional antenna mounted on and rotatable with respect to said vehicle, a second receiver connected to said second antenna, means for controlling the rudder of said vehicle in accordance with the sign of the output of said second receiver to direct said vehicle toward a second reference radio transmitter, and means for rotating said second antenna by an amount corresponding to the angular displacement of said first antenna with respect to the longitudinal axis of said vehicle.

5. Radio control apparatus for a dirigible vehicle comprising a first directional antenna mounted on and rotatable with respect to said vehicle, a receiver connected to said antenna, means for rotating said antenna in accordance with the sign of the output of said receiver to cause said antenna to assume a position in accordance with the direction of a first reference radio transmitter with respect to the longitudinal axis of said vehicle, a second directional antenna mounted on and rotatable with respect to said vehicle, a second receiver connected to said second antenna, means for controlling the rudder of said vehicle in accordance with the sign of the output of said second receiver to direct said vehicle toward a second reference radio transmitter, means for locking said second antenna in a predetermined position with respect to said vehicle, means for unlocking said second antenna, and means for simultaneously rotating said second antenna in accordance with the rotation of said first antenna.

6. Radio control apparatus for a dirigible vehicle comprising a first directional antenna mounted on and rotatable with respect to said vehicle, a receiver connected to said antenna, means for rotating said antenna in accordance with the sign of the output of said receiver to cause said antenna to assume a position in accordance with the direction of a first reference radio transmitter with respect to the longitudinal axis of said vehicle, a second directional antenna mounted on and rotatable with respect to said vehicle, a second receiver connected to said second antenna, means for controlling the rudder of said vehicle in accordance with the sign of the output of said second receiver to direct said vehicle toward a second reference radio transmitter, means for locking said second antenna in a predetermined position with respect to said vehicle, means for unlocking said second antenna, an arm attached to rotate with said second antenna, stop means positioned by rotation of said first antenna, and means energized by rotation of said first antenna to rotate said arm to contact said stop means.

7. Radio control apparatus for a dirigible vehicle comprising a first directional antenna mounted on and rotatable with respect to said vehicle, a receiver connected to said antenna, means for rotating said antenna in accordance with the sign of the output of said receiver to cause said antenna to assume a position in accordance with the direction of a first reference radio transmitter with respect to the longitudinal axis of said vehicle, a second directional antenna mounted on and rotatable with respect to said vehicle, a second receiver connected to said second antenna, means for controlling the rudder of said vehicle in accordance with the sign of the output of said second receiver to direct said vehicle toward a second reference radio transmitter, means for locking said second antenna in a predetermined position with respect to said vehicle, means for unlocking said second antenna, an arm attached to rotate with said second antenna, stop means positioned by rotation of said first antenna, and means energized by rotation of said first antenna to rotate said arm to contact said stop means only after said first antenna has remained in rotated position for a predetermined length of time.

8. Radio control apparatus for a dirigible vehicle comprising a first directional antenna mounted on and rotatable with respect to said vehicle, a receiver connected to said antenna, means for rotating said antenna in accordance with the sign of the output of said receiver to cause said antenna to assume a position in accordance with the direction of a first reference radio transmitter with respect to the longitudinal axis of said vehicle, a second directional antenna mounted on and rotatable with respect to said vehicle, a second receiver connected to said second antenna, means for controlling the rudder of said vehicle in accordance with the sign of the output of said second receiver to direct said vehicle toward a second reference radio transmitter, power means for rotating said second antenna, an arm attached to rotate with said second antenna, an electrically operated latch for locking said arm, stop means in the path of rotation of said arm and positioned by rotation of said first antenna, and means operated by rotation of said first antenna to simultaneously energize said latch unlocking said arm, and to energize said power means to rotate said arm.

9. Radio control apparatus for a dirigible vehicle comprising a first directional antenna mounted on and rotatable with respect to said vehicle, a receiver connected to said antenna, means for rotating said antenna in accordance with the sign of the output of said receiver to cause said antenna to assume a position in accordance with the direction of a first reference radio transmitter with respect to the longitudinal axis of said vehicle, a second directional antenna mounted on and rotatable with respect to said vehicle, a second receiver connected to said second antenna, means for controlling the rudder of said vehicle in accordance with the sign of the output of said second receiver to direct said vehicle toward a second reference radio transmitter, power means for rotating said second antenna, an arm attached to rotate with said second antenna, an electrically operated latch for locking said arm, stop means in the path of rotation of said arm and positioned by rotation of said first antenna, a cam mounted to rotate with said first antenna, right and left switches operated in accordance with rotation of said cam, and means for connecting said switches with said power means to rotate said arm in accordance with closure of one of said switches and for operating said latch to unlock said arm.

10. Apparatus in accordance with claim 9 wherein said power means comprise right and left solenoids having cores connected to rotate said arm, and wherein said right and left switches are connected respectively to said right and left solenoids by separate time delay switches.

11. Apparatus in accordance with claim 9 wherein said power means comprise right and left solenoids having cores connected to rotate said arm, wherein said right and left switches are connected respectively to said right and left solenoids by separate time delay switches, and wherein the time delay of said switches is set to be greater than the normal swing across a direct course line between said transmitters when said vehicle is operating with said arm in loaded position.

12. The method of steering a dirigible vessel with a radio direction finder system including a directional element rotatably mounted on said vehicle which comprises steering said vehicle in accordance with the position of said directional element on a homing course toward a first reference radiation source, with a predetermined angular relationship of said directional element in respect to the longitudinal axis of said vessel and modifying said predetermined angular relationship of said directional element with respect to the longitudinal axis of the vehicle in accordance with the direction of a second reference radiation source.

13. The method of steering a vessel with a radio direction finder system including a directional element rotatably mounted on said vehicle which comprises steering said vehicle in accordance with the position of said directional element on a homing course toward a first reference radiation source, with a predetermined angular relationship of said directional element in respect to the longitudinal axis of said vessel, determining on said vessel the direction of a second reference radiation source, and changing said predetermined angular relationship of said directional element with respect to the longitudinal axis of the vehicle in accordance with said latter direction determination in an amount and direction maintaining said vessel on a true course between said reference sources.

14. The method of steering a dirigible vessel with a radio direction finder system including a directional element rotatably mounted on said vehicle which comprises steering said vehicle in accordance with the position of said directional element on a homing course toward a first reference radiation source, with a predetermined angular relationship of said directional element in respect to the longitudinal axis of said vessel, determining on said vessel the direction of a second reference radiation source, and changing said predetermined angular relationship of said directional element with respect to the longitudinal axis of the vehicle in accordance with said latter direction determination only after a predetermined time elapse after a change in such direction.

15. The method of controlling a dirigible vehicle substantially on a true course determined by a pair of substantially non-directional reference radio transmitters, said vehicle being provided wih a pair of radio direction finder systems, each including a directional element separately rotatable with respect to the longitudinal axis of said vehicle, which comprises the steps of tuning said direction finders respectively to receive signals from said transmitters, controlling the rudder of said vehicle in accordance with the signal output of one of said direction finder systems to steer the vehicle in the direction of the reference transmitter to which the system is tuned, rotating the included directional element of the other direction-finder system in accordance with the output thereof to a position indicative of the direction of the other reference transmitter to which said latter system is tuned, and linking the directional element of said first direction-finder system with said second directional element to change the angular position of said first directional element with respect to the longitudinal axis of the vehicle.

16. The method of controlling a dirigible vehicle substantially on a true course determined by a pair of spaced substantially non-directional reference radio transmitters, said vehicle being provided with a pair of radio-direction finder systems, each including a directional element separately rotatable with respect to the longitudinal axis of said vehicle, which comprises the steps of tuning said direction finders respectively to receive signals from said transmitters, steering said vehicle in accordance with the signal output of one of said direction-finder systems in the direction of the reference transmitter to which said system is tuned, and rotating the directional element of said first direction finder system with respect to the longitudinal axis of the vehicle in accordance with the signal output of the other direction finder system.

17. The method of controlling a dirigible vehicle substantially on a true course determined by a pair of spaced substantially non-directional reference radio transmitters, said vehicle being provided with a pair of radio-direction finder systems, each including a directional element separately rotatable with respect to the longitudinal axis of said vehicle, which comprises the steps of tuning said direction finders respectively to receive signals from said transmitters, steering the vehicle in accordance with the signal output of one of said direction-finder systems toward the reference transmitter to which said system is tuned, and rotating the directional element of the other direction-finder system in accordance with the signal output thereof to a position indicative of the direction of the other reference transmitter with respect to the longitudinal axis of the vehicle, and rotating the directional element of said first direction finder system with respect to the longitudinal axis of the vehicle in accordance with the indication of said second direction finding system.

18. The method of controlling a dirigible vehicle substantially on a true course determined by a pair of spaced substantially non-directional reference radio transmitters, said vehicle being provided with a pair of radio-direction finder systems, each including a directional element separately rotatable with respect to the longitudinal axis of said vehicle, which comprises the steps of tuning said direction finders respectively to receive signals from said transmitters, steering the vehicle in accordance with the output of one of said direction finder systems toward the reference transmitter to which said system is tuned, rotating the directional element of the other direction finder system in accordance with the signal output thereof to a position indicative of the direction of the other reference transmitter with respect to the longitudinal axis of the vehicle, and linking said latter directional element to the directional element of the first direction finder system to rotate the same with respect to the longitudinal axis of the vehicle, in an amount and in a direction maintaining said vehicle on a true course between said transmitters.

19. Method in accordance with claim 15 with the additional step of delaying the rotation of the directional element of the first direction finder system for a predetermined time after said second directional element has been rotated.

RAY W. GUDIE.